No. 876,534. PATENTED JAN. 14, 1908.
D. FARNUM & C. R. ANDERSON.
MACHINE FOR AGING AND AGITATING WHISKY.
APPLICATION FILED JAN. 28, 1907.
4 SHEETS—SHEET 1.
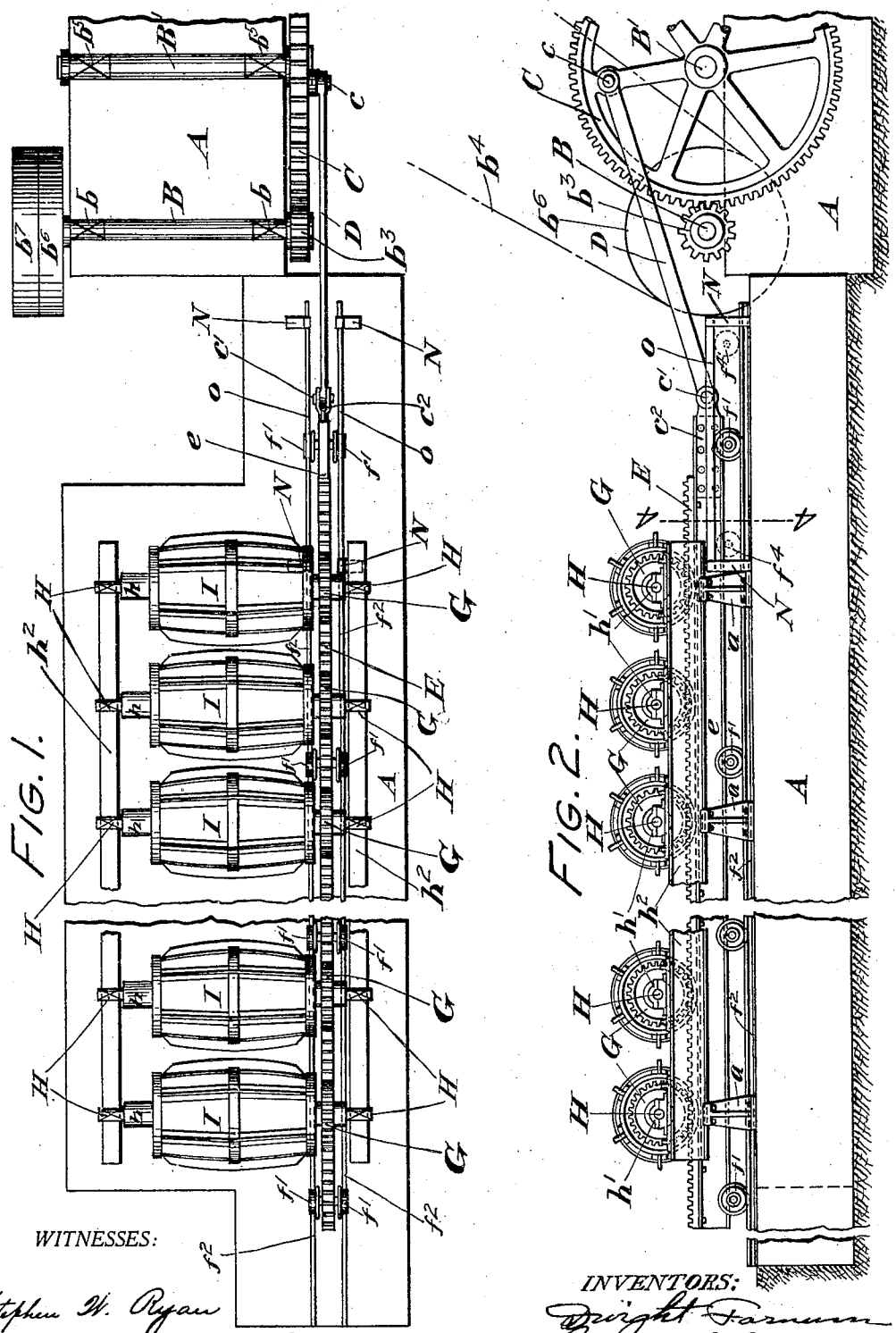
WITNESSES:
Stephen W. Ryan
Charles R. Bosworth
INVENTORS:
Dwight Farnum
Clarence R. Anderson

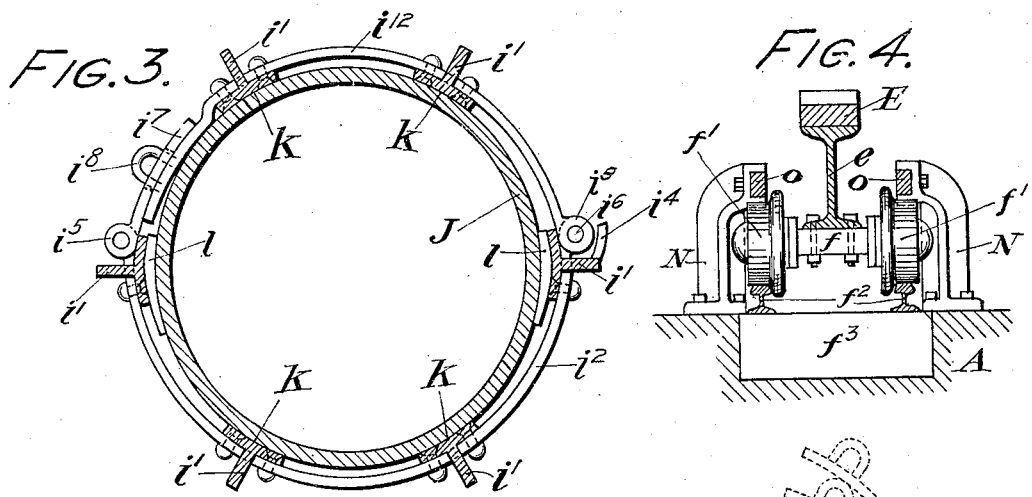
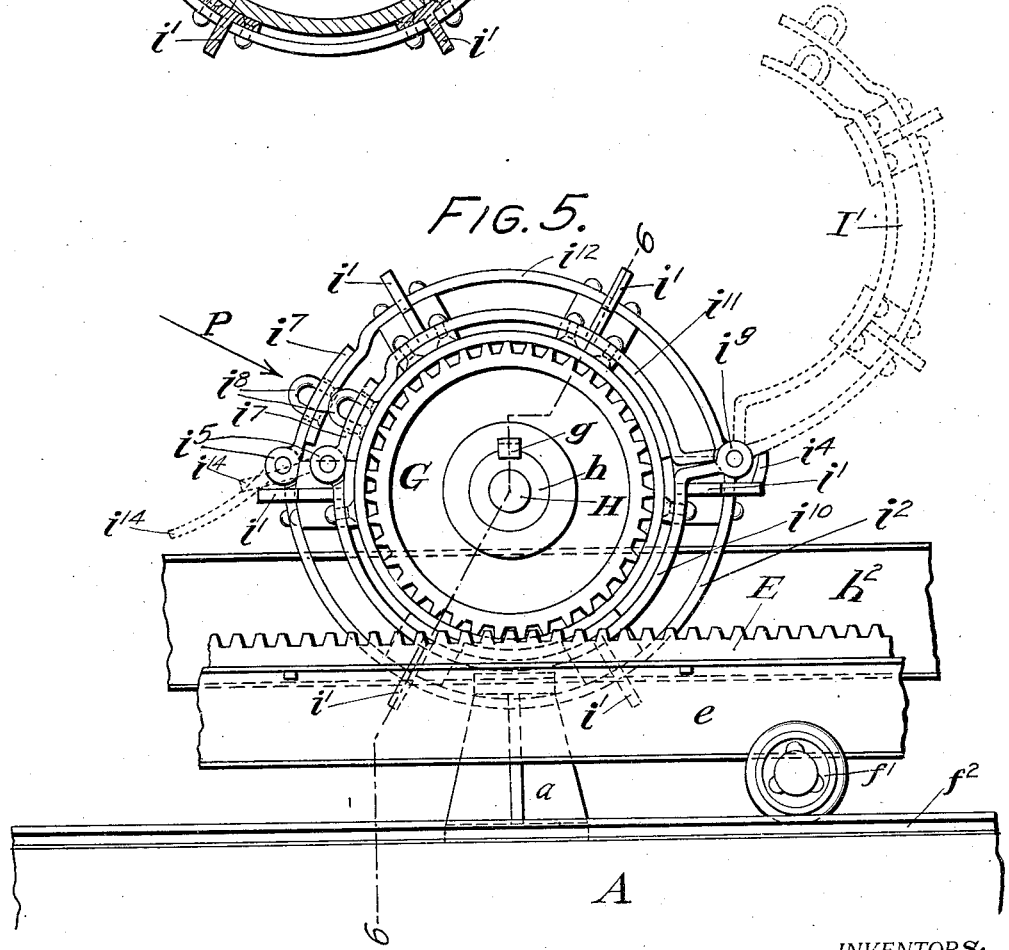

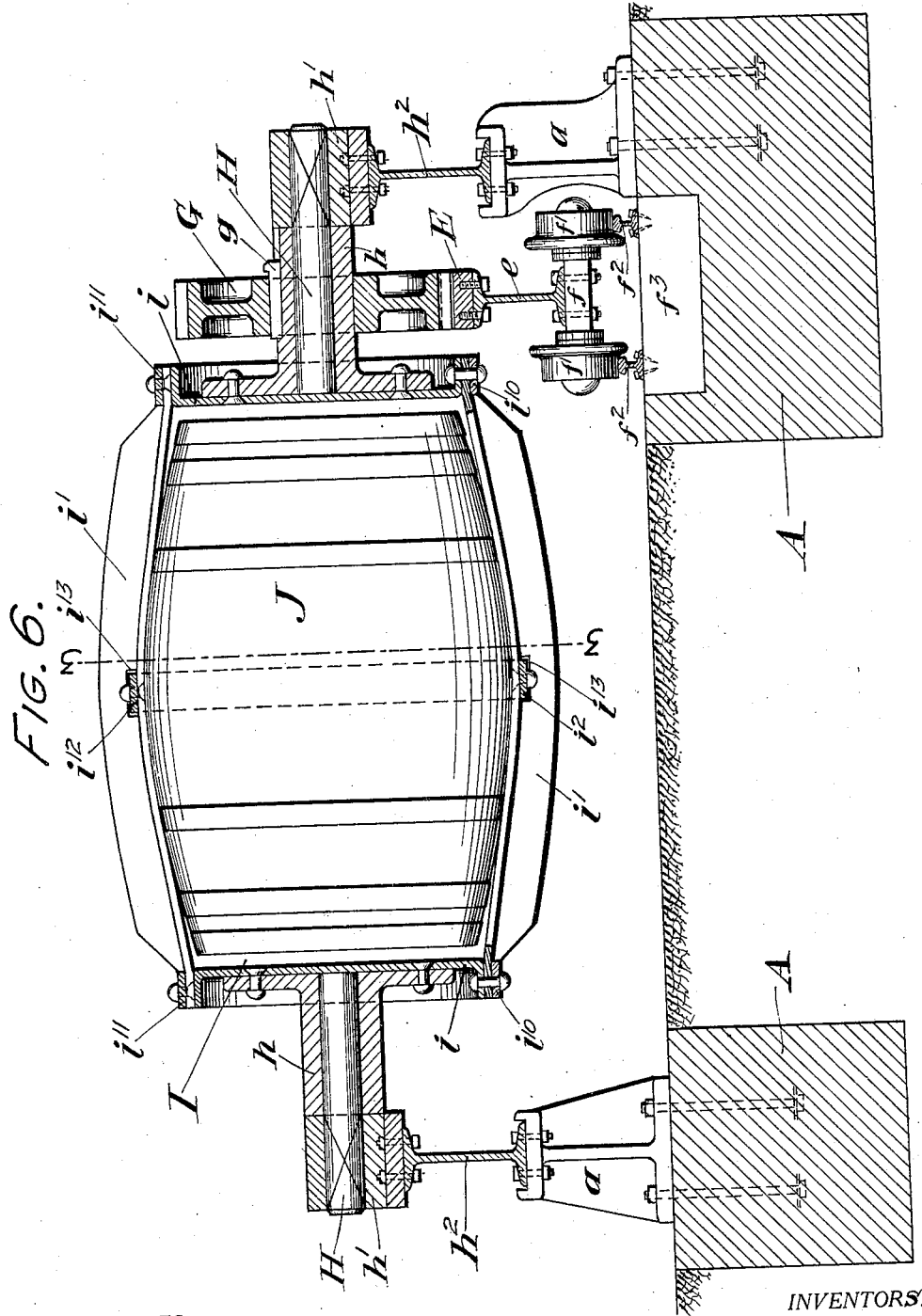

No. 876,534. PATENTED JAN. 14, 1908.
D. FARNUM & C. R. ANDERSON.
MACHINE FOR AGING AND AGITATING WHISKY.
APPLICATION FILED JAN. 28, 1907.
4 SHEETS—SHEET 4.
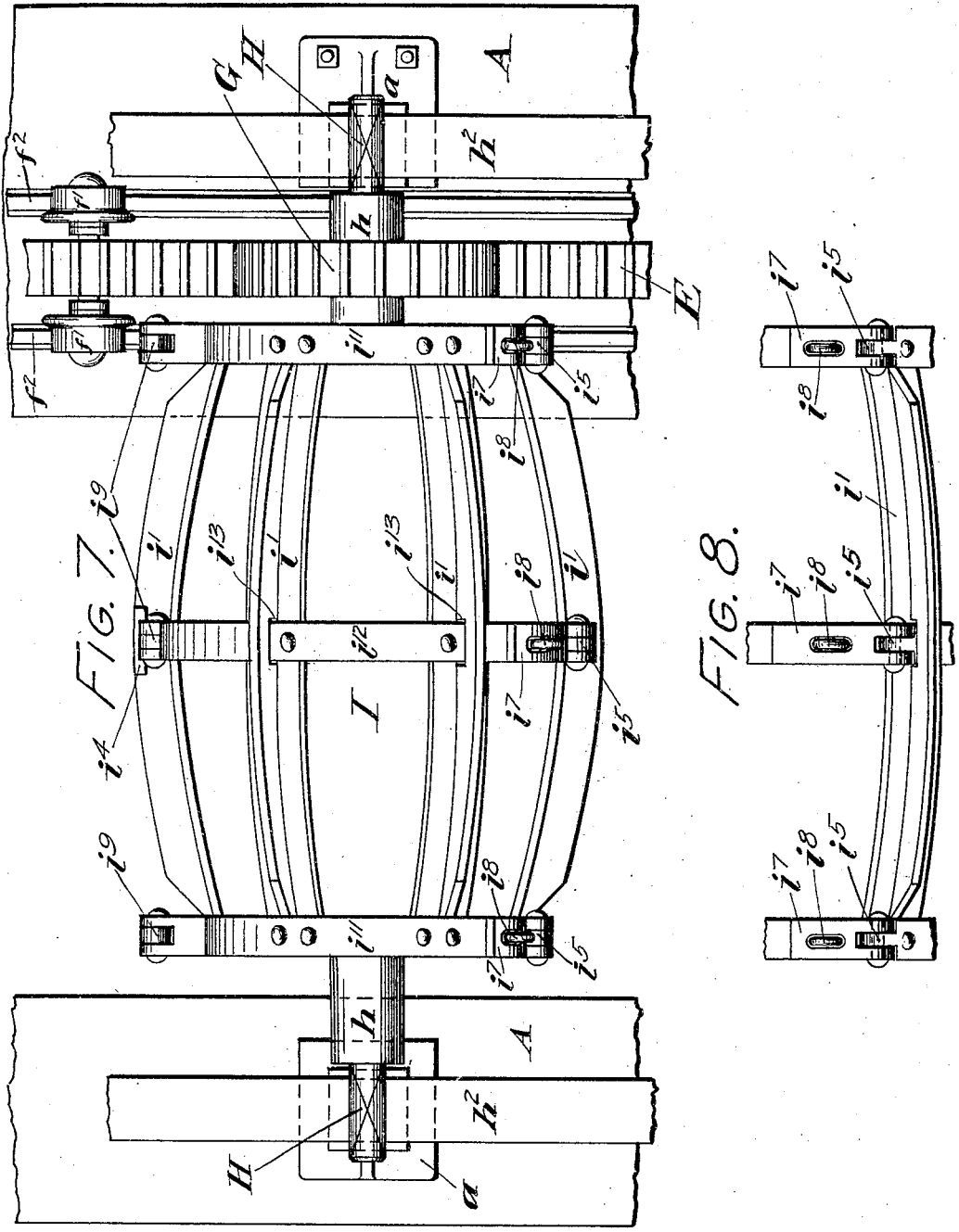
WITNESSES:
Stephen W. Ryan
Clyde E. Vance
INVENTORS:
Dwight Farnum
Clarence R. Anderson

UNITED STATES PATENT OFFICE.

DWIGHT FARNUM AND CLARENCE R. ANDERSON, OF DENVER, COLORADO.

MACHINE FOR AGING AND AGITATING WHISKY.

No. 876,534.　　Specification of Letters Patent.　　Patented Jan. 14, 1908.

Application filed January 28, 1907. Serial No. 354,494.

*To all whom it may concern:*

Be it known that we, DWIGHT FARNUM and CLARENCE R. ANDERSON, citizens of the United States, residing in the city and county of Denver and State of Colorado, have invented a new and useful Machine for the Aging and Agitation of Whisky, of which the following is a specification.

Our invention relates to improvements in machines for the mechanical aging and agitation of whisky, by means of imparting a revolutionary motion, alternately in opposite directions, to barrels containing whisky; the object of the revolutionary motion being to throw the central portion of the liquid towards the outer portion and also to give to the liquid mass in the barrels a momentum in the direction of the motion of the barrels for the time being; this momentum causing the liquid to be thoroughly agitated upon the reversal of the motion of the barrels; and the objects of our improvements are, first, to provide a machine to treat twenty-four barrels, containing whisky, at one time, each machine to be considered and installed as one unit of a plant; however, we do not limit ourselves as to the capacity above mentioned as machines may be constructed to treat as many or as few barrels at one time as may be practicable; second, to afford a means of imparting the desired motion to a series of gears by means of a rack, supported upon trucks running backward and forward on a track, engaging in said series of gears and operated by means of a connecting-rod operated by a crank; third, to devise a cage to hold the barrels securely therein, and by which said barrels can be supported and revolved by a shaft, permanently fixed in a sleeve to which said gears are keyed, journaled in the bearings of the adjustable journal boxes. We attain these objects by mechanism illustrated in the accompanying drawings, in which:—

Figure 1 is a plan view of the machine; Fig. 2, a side elevation view of the machine; Fig. 3, a vertical section of the cage containing the barrel, on the line 3—3 in Fig. 6; Fig. 4, a vertical section of the rack, attached to an I-beam, supported on a truck running on a track, also of the guards, on the line 4—4 in Fig. 2; Fig. 5, an end elevation of the cage, a side elevation of the I-beam, which upholds the cages, supported by standards resting upon the foundation, and a side elevation of the rack attached to an I-beam supported upon a truck running upon a track; and by dotted lines, the door of the cage in an open position, also the hasps of the locks of the door in an open position; Fig. 6, an end view of the machine on the line 6—6 in Fig. 5, showing the barrel in position within the cage; also the shaft of the cage in its bearings and the rack attached to an I-beam supported upon a truck resting upon a track, meshing in a gear-wheel; Fig. 7, a top view of the cage, gear-wheel and rack, also of the I-beams, standards and foundation; Fig. 8, a view taken in the direction of the arrow (P) in Fig. 5, of the three locks securing the door of the cage.

Similar letters refer to similar parts throughout the several views.

The foundation (A), upon which the standards (a) of the machine rest and into which they are anchored, Fig. 6, may be of wood, cement, concrete or other suitable material. The foundation (A) as shown in Figs. 1 and 2, is built in one entire and solid mass, while in Figs. 6 and 7, the said foundation (A) is shown as being of two separate parts. These two different methods of constructing the foundation (A) are given to show that it is immaterial how the foundation is built if it be strong enough to uphold the machine properly.

In the bearings of the journal boxes (b), Fig. 1, which are secured to the foundation (A) by anchor bolts, turns the shaft (B) at one end of which is keyed the tight pulley ($b^6$) and also on which revolves the loose pulley ($b^7$).

The power, necessary to operate the machine, is applied by means of a belt ($b^4$), Fig. 2, to the tight pulley ($b^6$) conveying motion to the pinion ($b^3$) keyed to the shaft (B). The pinion ($b^3$) meshes in the large gear-wheel (C), keyed to the shaft (B') which turns in the bearings ($b^5$), in a spoke of which is a crank-pin (c) connected, by means of the connecting-rod (D), with the pin (c') in the yoke ($c^2$) riveted to the I-beam (e). The I-beam (e) rests upon trucks, and is bolted to the axles (f) which rest in the self-lubricating, flanged wheels (f') which run upon the track rails ($f^2$). To the upper surface of the upper flange of the I-beam (e) is screwed or otherwise suitably attached the rack (E), which meshes in the series of independent gears (G). Each gear-wheel (G) is keyed by means of the key (g), Figs. 5 and 6, to the sleeve (h) riveted to the end-plate (i), Fig. 6, of the cage (I), Fig. 7, in which is locked the barrel (J), Fig. 6. The two shafts (H), the centers of which are on the same line, are permanently fixed in the sleeves (h) by means of shrinking or other suitable process. The two shafts (H) turn in the bearings of the journal boxes (h'), Figs. 2 and 6, bolted to and resting upon the upper surface of the upper flange of the I-beams ($h^2$) which rest upon and are bolted to the standards (a).

The cage (I) is constructed of T-iron ribs ($i^1$) , flat hoops ($i^{11}$ and) ($i^{12}$) of the door of the cage and flat hoops ($i^{10}$) and ($i^2$) of the main body of the cage, end-plates (i) and sleeves (h), all riveted together. In the webs of the T-iron ribs are cut the slots ($i^{13}$) through which pass the hoops ($i^{12}$) and ($i^2$). The two shafts (H) are permanently fixed into the sleeves (h). The cage (I) is composed of two parts: the main body and the door (I') (shown in an open position by dotted lines, also the hasps ($i^7$) shown in an open position by dotted lines ($i^{14}$) in Fig. 5). The door (I') when in the open position is prevented from falling back too far by means of the stop ($i^4$) integral to the web of the T-iron rib (i'). The door (I') is attached to the cage (I) by three hinges ($i^9$) formed by bending and shaping the ends of the hoops ($i^{11}$) and ($i^{12}$), also ($i^{10}$) and ($i^2$) into eyes through which pass riveted pins ($i^6$). The door (I') when closed is securely fastened by three hasps ($i^7$) hinged at ($i^5$) to the hoops ($i^{10}$) and ($i^2$), passing over and inclosing within their slotted holes the eyes ($i^8$) which are riveted to the hoops ($i^{11}$) and ($i^{12}$). These hasps ($i^7$) may be securely locked in place by means of pad-locks, passed through the eyes ($i^8$), wedges or other suitable device. It is taken for granted that the distillery uses barrels of approximately uniform sizes and that the cage (I) should be built to fit as nearly as possible the quarter-barrels, half-barrels or whole-barrels such as are used. Should there be any small variation in the size of the barrels, of any one class, the barrels may be securely fastened within the cage (I) by placing pieces of rubber belting between the flange of the T-iron ribs (i') of the cage (I) and the surface of the barrel (J) at the points marked (k), Fig. 3, before the door is closed and locked into position. Wedges of wood (l), Fig. 3, are driven in between the flange of the T-iron ribs (i') and the surface of the barrel (J), at the points opposite the hinges ($i^9$) of the door (I') and the hinges ($i^5$) of the hasps ($i^7$). When the door (I') of the cage (I) is open there is enough spring or give to the component parts of the cage to allow the driving in of the wedges (l) and allow the belly of the wedges to pass into their proper positions as shown in Fig. 3.

As the large gear-wheel (C), Fig. 2, revolves, the rack (E) attached to the I-beam (e), supported upon its trucks, is caused to travel back and forth over the track rails ($f^2$), spiked to the sleepers ($f^3$), Fig. 6, in a direction at right-angles to the axis of the barrel-cages (I), causing the said barrel-cages (I) to revolve in the bearings of the journal boxes (h'), Figs. 2 and 6. With each revolution of the large gear-wheel (C) the rack (E) attached to the I-beam (e), supported upon its trucks, traverses its entire length of stroke and the gear-wheels (G) are of such diameter as to cause the barrel-cages (I) to revolve in the bearings of the journal boxes (h'), Figs. 2 and 6, from one to two entire revolutions with each entire stroke of the rack (E), the purpose being to revolve the barrel-cages (I) a sufficient number of times to give a momentum to the liquid contained within the barrels (J). The wheels ($f^4$), shown in the dotted lines, Fig. 2, show the position of the truck wheels (f') running in the guards when at the extremities of the stroke, the speed of the large gear-wheel (C) being about twelve revolutions per minute.

To prevent the rack (E), supported upon its trucks, from being lifted off from the track rails ($f^2$) on the upward motion of the crank-pin (c) in the large gear-wheel (C), Fig. 2, the guards, Figs. 1, 2 and 4, consisting of standards (N) and horizontal bars (O) which confine the wheels (f') upon the track rails ($f^2$) are placed at the head end of the track rails ($f^2$). The truck wheels (f') of the rack (E) which run upon the track rails ($f^2$), pass under the bars (O) and run in between the track rails ($f^2$) and the bars (O) of the guards, as shown in Figs. 1, 2 and 4. Sufficient space is allowed between the horizontal bars (O) of the guards and the track rails ($f^2$) so that the truck-wheels (f') may run freely and touch only the track rails ($f^2$) on the forward stroke of the rack (E) and the horizontal bars (O) on the return stroke of the rack (E), should the truck wheels (f') be lifted off from the track rails ($f^2$), as the case may be.

Having thus fully described our invention, what we claim as new and desire to secure by Letters-Patent is:—

1. In a machine for agitating and aging liquor, the combination of a driving shaft rotatably journaled in its bearings, a pinion fixed on said shaft, said pinion meshing into a crank wheel mounted on another shaft rotatably journaled in its bearings; a crank-pin on said crank wheel engaging a connecting-rod attached to one end of a rack-beam, said rack-beam supported throughout its length by a series of axles, each axle journaled in a pair of suitable wheels; with guards suitably supported, over the pair of wheels nearest the point where the connecting rod is attached, as and for the purpose specified.

2. In an agitating and aging machine, the combination of the driving shaft; with means for imparting a reciprocating rectilinear motion to the rack-beam; a series of cages or baskets suitably journaled in bearings mounted on a stationary rigid frame; each cage or basket having a relatively immovable gear wheel attached, said gear meshing with said rack-beam and receiving its motion therefrom, causing each cage to assume a reciprocating rotary motion substantially as specified.

3. In an agitating and aging machine the combination of the rack beam supported at frequent intervals by an axle journaled in suitable wheels with means for reciprocating said rack-beam; guards for said wheels to roll in and on; with said rack-beam engaging a series of consecutive gear wheels, each gear fastened to a separate shaft and each shaft carrying a cage adapted to receive a barrel or cask, for the purpose specified.

4. In an agitating and aging machine, the combination with the rack-beam and means for reciprocating it of a rigid stationary frame, a series of bearings connected to said frame and a series of cages or baskets mounted upon shafts, said shafts journaled in said bearings, each cage being adapted to receive a barrel or cask; movable wedges to hold said barrel or cask in place; a door hinged to said cage and means for holding said door secure when closed, substantially as described.

5. The combination of the curved T-iron cross-bars forming the cage or basket body with the heads; spiders rigidly connected to said heads, each spider having an extended sleeve or hub integral with itself; said sleeve or hub keyed or shrunk onto a shaft stem; with means for holding in place a barrel or cask and the whole adapted to be rotatably mounted in fixed bearings and to engage a rack-beam, with means for reciprocating said rack beam.

6. The combination of the cage-body, with a door hinged thereto, said door being formed of curved T-irons connected to each other by lateral curved bars; a stop integral with one of the cross-bars of cage body and against which the door rests when fully opened; with staples secured in the free ends of said lateral curved bars and said staples adapted to be engaged by hasps hinged on said cage-body, said staples being adapted to be locked or held in engagement with said hasps by any suitable means, the cage being further adapted to engage a rack-beam with means for reciprocating said rack-beam, all substantially as specified.

DWIGHT FARNUM.
CLARENCE R. ANDERSON.

Witnesses:
STEPHEN W. RYAN,
CHARLES R. BOSWORTH.